United States Patent

Huys et al.

(10) Patent No.: US 9,256,204 B2
(45) Date of Patent: Feb. 9, 2016

(54) DEVICE AND METHOD FOR HOLOGRAPHIC REFLECTION IMAGING

(71) Applicant: IMEC, Leuven (BE)

(72) Inventors: Roeland Huys, Wilsele (BE); Richard Stahl, Rotselaar (BE); Geert Vanmeerbeeck, Keerbergen (BE); Peter Peumans, Herfelingen (BE)

(73) Assignee: IMEC, Leuven (BE)

( * ) Notice: Subject to any disclaimer, the term of this patent is extended or adjusted under 35 U.S.C. 154(b) by 142 days.

(21) Appl. No.: 13/869,703

(22) Filed: Apr. 24, 2013

(65) Prior Publication Data

US 2013/0278982 A1 Oct. 24, 2013

(30) Foreign Application Priority Data

Apr. 24, 2012 (EP) .................................. 12165342

(51) Int. Cl.
*G03H 1/26* (2006.01)
*G02B 5/32* (2006.01)
*G02B 5/28* (2006.01)
*G02B 1/10* (2015.01)
*G03H 1/04* (2006.01)
*G03H 1/00* (2006.01)
*G03H 1/02* (2006.01)

(52) U.S. Cl.
CPC .............. *G03H 1/26* (2013.01); *G03H 1/0402* (2013.01); *G03H 1/0443* (2013.01); *G03H 1/0465* (2013.01); *G03H 2001/005* (2013.01); *G03H 2001/0212* (2013.01); *G03H 2001/0447* (2013.01); *G03H 2226/11* (2013.01)

(58) Field of Classification Search
None
See application file for complete search history.

(56) References Cited

U.S. PATENT DOCUMENTS

2010/0060962 A1* 3/2010 Rosen ............................. 359/29
2013/0093871 A1* 4/2013 Nowatzyk et al. ............. 348/79

FOREIGN PATENT DOCUMENTS

WO WO2011/049965 A1 4/2011

OTHER PUBLICATIONS

European Search Report, European Patent Application No. 12165342.2 dated Aug. 3, 2012.
Seo, Sungkyu et al., "Lensfree Holographic Imaging for On-Chip Cytometry and Diagnostics", Lab Chip, vol. 9, 2009, pp. 777-787.
Lee, Myungjun et al., "Field-Portable Reflection and Transmission Microscopy Based on Lensless Holography" Biomedical Optics Express, vol. 2, No. 9, Sep. 1, 2011, 2721-2730.

* cited by examiner

*Primary Examiner* — Jade R Chwasz
(74) *Attorney, Agent, or Firm* — McDonnell Boehnen Hulbert & Berghoff LLP

(57) ABSTRACT

A holographic imaging device for imaging an object under study includes a partially reflective surface having a contact side for contacting the object under study and an imaging side for partially reflecting a radiation wave. The device also includes at least one radiation source for projecting the radiation wave onto the imaging side of the partially reflective surface and an image sensor arranged to receive the radiation wave when reflected by the partially reflective surface. The image sensor is adapted for determining an interference pattern between the radiation wave reflected by the imaging side of the partially reflective surface and the radiation wave reflected by the object under study when contacting the contact side of the partially reflective surface.

19 Claims, 4 Drawing Sheets

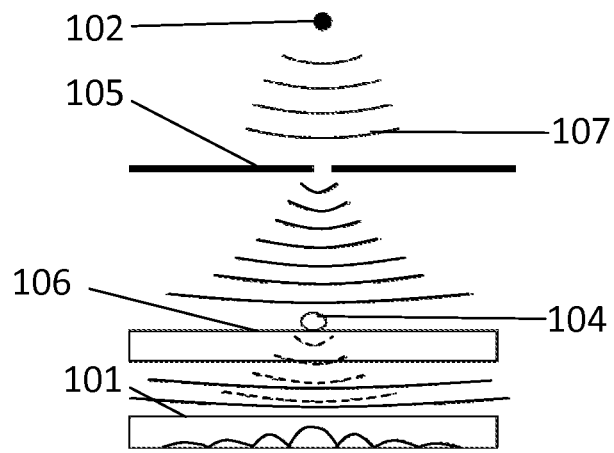
FIG. 1 – PRIOR ART
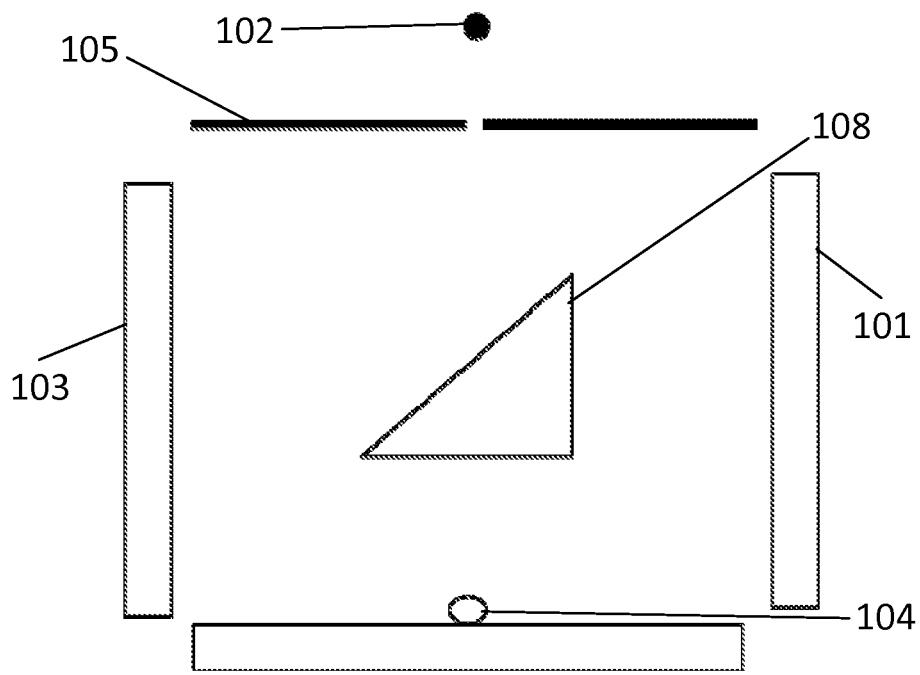
FIG. 2 – PRIOR ART

DEVICE AND METHOD FOR HOLOGRAPHIC REFLECTION IMAGING

CROSS-REFERENCE TO RELATED APPLICATION

This application claims priority to European Patent Application No. 12165342.2 filed on Apr. 24, 2012, the contents of which are hereby incorporated by reference.

FIELD OF THE DISCLOSURE

The present disclosure relates to the field of holographic imaging. More specifically it relates to the field of digital holographic microscopy, such as for observation and analysis of biological tissues.

BACKGROUND OF THE DISCLOSURE

Holography was invented over 60 years ago by the physicist Dennis Gabor and is a technique that allows the light scattered from an object to be recorded and later reconstructed. Digital holography uses digital reconstruction of the diffraction patterns.

In digital holographic microscopy, a diffraction pattern, obtained by interference between a reference wave and an object wave which has interacted with an object of interest, may be detected and stored in a digital recording. By applying a reconstruction algorithm to such a recorded diffraction pattern, an image or image signature of the object of interest may be obtained. Coherent or partially coherent light, collimated by a small aperture, may be used to illuminate an object in order to produce a diffraction pattern. This diffraction pattern may then be acquired by a high resolution optoelectronic sensor array. Such a lens-free holographic microscopy setup may produce a hologram of the object with phase information encoded in the diffraction images. Lens-free holographic imaging can provide an attractive low-cost solution for imaging small objects, for example, microscopic objects, such as biological cells, because no expensive or complex optical components, such as high-quality optical lenses, are required.

Methods for holographic imaging in biological applications known in the art may be primarily based on in-line transmission geometry, in which coherent light from a light source illuminates a sample, which may be positioned on a glass substrate, and the diffraction or fringe pattern is recorded on an imager which is positioned on the opposite side of the sample with respect to the light source.

FIG. 1 illustrates an exemplary holography setup, which may be known in the art, for creating a holographic image of a transparent object. This setup comprises a light source 102, an aperture 105 (e.g., a pin-hole), a transparent surface 106 (e.g., a glass substrate) for supporting an object 104, and an image sensor 101. The aperture 105 may collimate a light wave 107 emanating from the light source 102 to produce a substantially planar parallel coherent or partially coherent light wave near the object 104 after propagating unimpeded over a suitable distance between the aperture 105 and the object 104. The light wave may then interact with the object 104, for example, the object may undergo a phase shift due to changes in refractive index while passing through the object. The diffraction pattern formed by interference of an object wave component, which has interacted with the object 104, and a reference wave component, which has passed through the transparent surface 106 without interacting with the object 104, may then be recorded by the image sensor 101.

In a paper by Su et al., published in Lab Chip, 2009, 9, 777-787, a lens-free holographic cytometer is disclosed. This paper describes an imaging and reconstruction method that may result in an improvement of the reconstructed images, by providing rich texture information. This system is furthermore used for characterization and counting of cells which are positioned on a CMOS imaging chip. The paper therefore demonstrates that identification and/or characterization of a heterogeneous cell solution on a chip is feasible based on pattern recognition of the holographic diffraction pattern of each cell type.

However, holographic imaging using an in-line transmission geometry may not be suitable for imaging non-transparent samples. Furthermore, dense or connected objects, such as biological tissue samples, may prevent the undistorted transmission of a suitable fraction of the wave through the sample in order to form a reference wave component. Therefore, when imaging such a non-transparent or dense sample, a suitable object wave component may preferentially be obtained by reflection on the surface of the sample, instead of transmission through the sample.

When a high resolution for small objects needs to be achieved, the reflective-mode setup may involve a complicated set-up. FIG. 2 illustrates the working principles of a field portable reflection/transmission microscope based on lens-less holography, which was disclosed in a paper by Lee et al., published in Biomedical Optics Express, 2011, 2(9), 2721-2730. The configuration of this setup is similar to that of a Michelson interferometer, and comprises a light source 102, an image sensor 101 (e.g., a CMOS sensor-chip), a reflective surface 103, and a beam splitting device 108. It demonstrates a lens-less reflection-mode microscope based on digital off-axis holography in which a beam-splitter 108 and a reflective surface 103 are used to produce a tilted reference wave for producing an interference pattern by superposition on the reflected light from the object 104. Therefore, an off-axis hologram of the object 104 is created on the image sensor 101. The beam-splitter 108 is an essential feature of the device for the interference of the reflected beam with the reflected light from an object to create the hologram.

SUMMARY

It is an aspect of embodiments of the present disclosure to provide good means and methods for creating holographic images. Generally, this aspect is accomplished by a method and device according to the present disclosure.

In a first aspect, the present disclosure provides a holographic imaging device for imaging an object under study. The device includes a partially reflective surface having a contact side for contacting the object under study and an imaging side for partially reflecting a radiation wave. The device also includes at least one radiation source for projecting the radiation wave onto the imaging side of the partially reflective surface. Further, the device includes an image sensor arranged to receive the radiation wave when reflected by the partially reflective surface. The image sensor is adapted for determining an interference pattern between the radiation wave reflected by the imaging side of the partially reflective surface and the radiation wave reflected by the object under study when contacting the contact side of the partially reflective surface.

It is an aspect of embodiments of the present disclosure that a simple and compact optical setup is provided for holographic imaging of non-transparent (e.g., reflective) objects.

It is an aspect of embodiments of the present disclosure that an imaging device is provided that may be placed close to the observed object, while capturing a large portion of the light diffracted by the object.

In embodiments of the present disclosure, the image sensor and the partially reflective surface may be arranged substantially parallel.

A device according to embodiments of the present disclosure may furthermore comprise a slab of transmissive material having a first surface arranged on the image sensor and a second surface being the partially reflective surface. The first surface and the second surface may be substantially parallel surfaces.

In a device according to embodiments of the present disclosure, the radiation source may be located between the image sensor and the partially reflective surface.

In a device according to embodiments of the present disclosure, the radiation source may be located on the image sensor.

In embodiments of the present disclosure, the image sensor may comprise at least one aperture optically coupled to the radiation source for imparting a spatial coherence to the radiation wave. The at least one radiation source may be located inside the at least one aperture. A device according to embodiments of the present disclosure may further comprise a MEMS-based optical valve arranged on the image sensor for shutting the aperture.

In embodiments of the present disclosure, the at least one radiation source may comprise a MEMS device for directing the radiation wave towards the partially reflective surface.

A device according to embodiments of the present disclosure may furthermore comprise a semi-transparent prism having a first surface arranged on the image sensor and a second surface being the partially reflective surface. The first surface and the second surface may be located under an angle different from 0° or 180° with respect to one another, e.g., the first and second surfaces may be located substantially perpendicular to one another. This embodiment allows for an easy and low-cost set-up, as there is no need for an aperture or a reflector.

In a device according to embodiments of the present disclosure, the at least one radiation source may comprise an optical waveguide, a light emitting diode, and/or a laser.

A device according to embodiments of the present disclosure may furthermore comprise an actuating means for moving the image sensor in relation to the object under study and/or the at least one radiation source for recording multiple images from the object.

In a device according to embodiments of the present disclosure, the image sensor may comprise a multispectral or hyperspectral image sensor.

In embodiments of the present disclosure, the at least one radiation source may comprise a plurality of light sources for emitting light of different wavelengths.

In a second aspect, the present disclosure provides a method for imaging an object under study. The method includes bringing an object under study into contact with a partially reflective surface, impinging an at least partially coherent radiation wave on the partially reflective surface, partially reflecting the radiation wave from the partially reflective surface and partially transmitting the radiation wave through the partially reflective surface, reflecting a radiation wave transmitted through the partially reflective surface from the object under study, and determining an interference pattern between the radiation wave reflected by the partially reflective surface and the radiation wave reflected by the object under study.

A method according to embodiments of the present disclosure may furthermore comprise reconstructing an image representation of the object under study taking into account the interference pattern.

Particular and preferred aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE DRAWINGS

FIG. 1 illustrates a prior art device for creating holographic images of a transparent object.

FIG. 2 illustrates a prior art device for creating holographic images of a non-transparent object.

Figure 3:
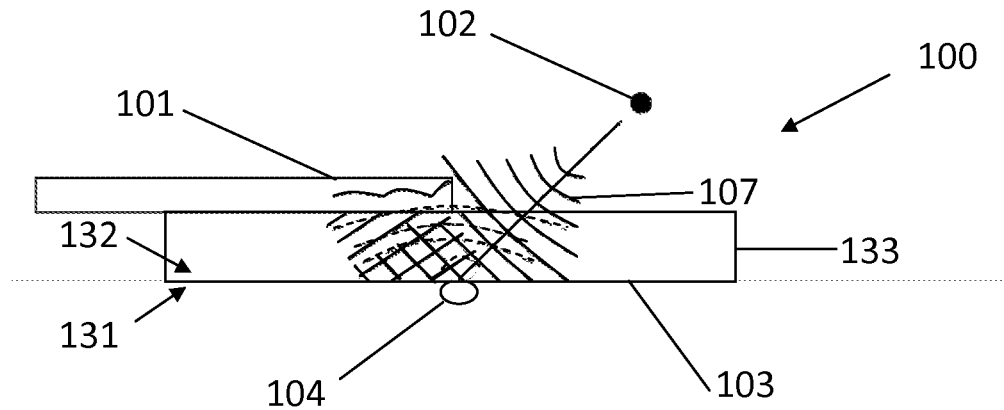
FIG. 3 shows a holographic imaging device according to a first embodiment of a first aspect of the present disclosure.

The drawings are only schematic and are non-limiting. In the drawings, the size of some of the elements may be exaggerated and not drawn on scale for illustrative purposes.

In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

In a first aspect, the present disclosure relates to a holographic imaging device for imaging an object under study. This holographic imaging device comprises a partially reflective surface, which has a contact side for contacting the object under study, and has an imaging side for partially reflecting an impinging radiation wave. The device further comprises a radiation source for directing the radiation wave towards this imaging side of the partially reflective surface. The holographic imaging device furthermore comprises an image sensor arranged so as to receive the radiation wave when reflected by the partially reflective surface and by the object under study. The image sensor is adapted for determining an interference pattern between on one hand the radiation wave reflected by the imaging side of the partially reflective surface, and on the other hand the radiation wave reflected by the object under study when contacting the contact side of the partially reflective surface.

It is an aspect of embodiments of the present disclosure that a compact set-up may be provided for imaging an object by merely contacting the object, e.g., requiring minimal manipulation of the object under study.

Referring to FIG. 3, a first exemplary embodiment of a holographic imaging device 100 for imaging an object under study 104 according to the first aspect of the present disclosure is presented.

Depending on the wavelength emitted by the radiation source, the object under study 104 may be a microscopic or nanometer-scale material entity (e.g., of dimensions less than 500 µm, 100 µm or less, less than 50 µm, less than 5 µm, or less than 500 nm). In particular embodiments, the object has dimensions larger than about half the wavelength emitted by the radiation source. The object under study 104 may comprise multiple connected or disconnected, independent or interrelated material entities, and may be of biological or non-biological nature. This object may be non-transparent (e.g., not suitable for transmission imaging). The object may have different refractive index properties than its surrounding medium (e.g. air or a solvent fluid) in order to at least partially reflect light incident thereupon. In embodiments of the disclosure, the object 104 may comprise particles, cells or other samples of a biological nature. Alternatively, the object 104 may not be of a biological nature, for example, a structure mounted or processed on a chip, such as a MEMS structure (e.g., MEMS cantilevers or micro-mechanical devices).

The device 100 comprises an image sensor 101. This image sensor 101 may comprise a multispectral or hyperspectral image sensor. The image sensor 101 may typically comprise a plurality of pixel elements (e.g., radiation sensor elements), which may be arranged in an array (e.g., a grid of such pixel elements). For example, the image sensor 101 may comprise a CCD or CMOS image sensor. The image sensor 101 may be adapted for providing a digital representation of the distribution of a radiative quantity received over an imaging plane of the image sensor 101.

The device 100 also comprises at least one radiation source 102, e.g., at least one light source. The at least one radiation source 102 may be a source of at least partially coherent radiation, e.g., a source of coherent or partially coherent radiation, e.g., having a spatial and temporal coherence sufficient for obtaining interference patterns. In particular embodiments, the coherence area of the radiation wave in a plane perpendicular to the direction of wave propagation and intersecting with the object 104 may be at least of similar dimensions as the object 104 to be imaged, and can be a multiple thereof, e.g., a factor 10 larger or even a factor 100 larger. Furthermore, the coherence time of the radiation wave propagating from the radiation source 102 may be at least sufficient to allow interference fringes to form over phase differences corresponding to the optical path length differences between waves reflecting off the object 104 and reflecting off the partially reflective surface 103 near the object 104. The radiation source 102 may therefore comprise a coherent or partially coherent light source, e.g., a coherent or partially coherent source of monochromatic visible light or narrow bandwidth visible light, such as, for example, a light emitting diode (LED) or a light amplification by stimulated emission of radiation device (LASER). While light may relate to visible light, it may also refer to invisible bands of the electromagnetic spectrum, e.g., the radiation source 102 may provide visible light, infrared light, microwaves, or ultraviolet light. However, embodiments of the present disclosure may equally relate to other radiation qualities, such as coherent electron waves, e.g., as used in electron microscopes, or coherent X-ray waves. While the radiation source 102 may comprise means for actively generating a specific radiation quality, such as a LED or LASER, the radiation source 102 may equally well comprise means for passively supplying and directing a radiation quality, such as an optical waveguide. The radiation source 102 may further comprise a plurality of interrelated or independent radiation sources, e.g., a plurality of light sources for emitting light of different wavelengths.

The device 100 further comprises a partially reflective surface 103. Particularly, this partially reflective surface 103 may be adapted to reflect the radiative quantity provided by the radiation source 102. For example, for visible light, the partially reflective surface 103 may comprise a semi-transparent mirror, e.g., a pellicle mirror. For other radiative quantities, the partially reflective surface 103 may comprise similar means for reflecting that type of radiation. In embodiments of the present disclosure, the partially reflective surface 103 may be arranged substantially parallel, e.g., within typical manufacturing tolerances, to the image sensor 101. The partially reflective surface 103 furthermore has a contact side 131 for contacting the object under study 104 and an imaging side 132 for partially reflecting the radiation wave 107.

The partially reflective surface 103 may be formed as a transition surface between two materials having different refractive indices. For example, in particular embodiments of the present disclosure, the device 100 may comprise a slab of transmissive material 133 having a first surface arranged on the image sensor 101 and a second surface being the partially reflective surface 103. This first surface and second surface may be substantially parallel surfaces, e.g., opposite surfaces of a rectangular cuboid slab. In such embodiments, the contact side 131 of the partially reflective surface 103 may be identified by an outside surface of the slab of transmissive material 133, and the imaging side 132 of the partially reflective surface 103 may be identified by the corresponding inside surface of the slab of transmissive material 133. The slab of transmissive material 133 may for example be glued, via the first surface, to the image receptor side of the imaging sensor 101, or the slab of transmissive material may be formed by coating such material onto the imaging sensor 101. The slab of transmissive material 133 may be composed of a solid transparent material, such as glass or transparent plastic, e.g., polymethyl methacrylate (PMMA) or polycarbonate (PC). The partially reflective surface 103 may thus be formed by a refractive index difference between this transmissive material and an outside medium for containing the object under study, for example, air, water, or a solvent.

The partially reflective surface 103 may be adapted for reflecting a fraction of incident radiation, for example, between 10% and 90%, between 20% and 75%, between 30% and 60%, or 50%. This partially reflective surface 103 may be partially transparent, e.g., allowing a fraction of incident radiation to pass through, e.g., between 10% and 90%, between 25% and 80%, between 40% and 70%, or 50%.

The at least one radiation source 102 is adapted for directing a radiation wave, e.g., a light beam, towards the imaging side 132 of the reflective surface 103. The radiation source 102 may be adapted for directing the radiation wave towards the imaging side 132 of the reflective surface 103 and towards the object under study 104. For example, a light source may illuminate both the partially reflective surface 103 and the object 104, in which the object 104 may be illuminated by the part of the radiation wave which transmits through the partially reflective surface 103.

The image sensor 101 is arranged so as to receive the radiation wave 107 when reflected by the partially reflective surface 103 and the radiation wave when reflected by the object under study 104. The image sensor 101 is furthermore adapted for determining an interference pattern between the radiation wave reflected by the imaging side 132 of the partially reflective surface 103 and the radiation wave reflected by the object under study 104, when contacting the contact side 131 of the partially reflective surface, e.g., in operation. In operation, the plane in which the partially reflective surface 103 lies may be located in between the object under study 104 and the imaging plane of the image sensor 101. The image sensor 101 may be arranged to receive the radiation wave reflected from the object 104 and to receive the radiation wave reflected from the partially reflective surface 103. The radiation wave reflected from the object 104 may act as an object beam, while the radiation wave reflected from the imaging side 132 of the partially reflective surface 103 may act as a reference beam, in order to jointly form, by wave interference, a holographic image at the imaging plane of the image sensor 101. The combination of this reference and object beams may therefore be recorded by the image sensor 101, so as to create a holographic image representation, e.g., a digitally stored hologram. The radiation wave reflected by the object under study 104 may transmit through the partially reflective surface 103 towards the image sensor 101, e.g., without requiring further intermediate optical elements for changing the direction of the reflected radiation wave. This allows a compact set-up of a holographic imaging device according to embodiments of the present disclosure.

In embodiments of the disclosure, the contact side 131 of the reflective surface 103 may be part of a micro-fluidic channel, e.g., may form a wall of a micro-fluidic channel, such that the object 104 may be contained in the micro-fluidic channel, e.g., transported in an aqueous solution, and such that the object 104 may be illuminated and imaged while travelling past the radiation source 102 and image sensor 101.

The image sensor 101 may record an interference pattern from the radiation wave, e.g., optical beam, reflected from the object under study 104 and the radiation wave, e.g., optical beam, reflected from the imaging side 132 of the partially reflective surface 103. In particular embodiments, the image sensor 101 and the partially reflective surface 103 may be arranged parallel or substantially parallel to one another, e.g., within manufacturing tolerances. The radiation waves are reflected by the partially reflective surface and the object onto the image sensor 101, such that additional optical components for projecting further optical beams onto the image sensor 101 to create a holographic image may be avoided.

The image sensor 101 and the partially reflective surface 103 may be separated by a small distance, e.g., less than 1 mm, for example 500 μm, or less than 100 μm, e.g., 50 μm.

In embodiments of the disclosure, the radiation source 102 may be located in between the image sensor 101 and the partially reflective surface 103. Particularly, the radiation source 102 may emit a radiation wave 107 towards the partially reflective surface 103 and the object under study 104 from a point or volume which is contained in the space between the plane in which the image sensor 101 lies and the plane in which the partially reflective surface 103 lies.

Figure 4:
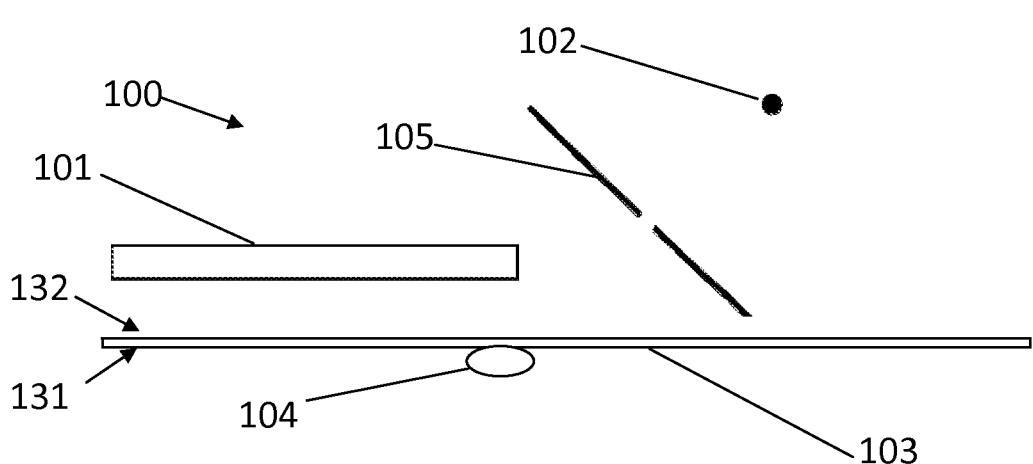
FIG. 4 shows a holographic imaging device according to a second embodiment of the first aspect of the present disclosure.

In a second embodiment according to the first aspect of the present disclosure, illustrated in FIG. 4, the radiation source 102 may further comprise at least one aperture 105 that is optically coupled to the radiation source 102, e.g., a pin-hole collimator placed in front of the radiation source 102, which can be an LED. Such aperture 105 may advantageously produce partially coherent or coherent radiation from the radiation source. For example, the aperture 105 may impart a spatial coherence to the radiation wave when reflecting on the reflective surface 103. Therefore, light may be produced which has a sufficiently large coherence area near the reflective surface 103, e.g., a coherence area as discussed hereinabove in relation to the radiation source 102. Therefore, the aperture 105, e.g., the pin-hole collimator, relaxes the coherence requirements of the radiation source 102 and may therefore reduce the overall cost of the device. In other words, the aperture 105 may improve the spatial coherence of the radiation wave 107 propagating from the radiation source 102, e.g., light emitted by a low-coherence source such as a LED, so as to enable the formation and recording of an interference pattern, e.g., holographic fringes, by the image sensor 101.

Figure 5:
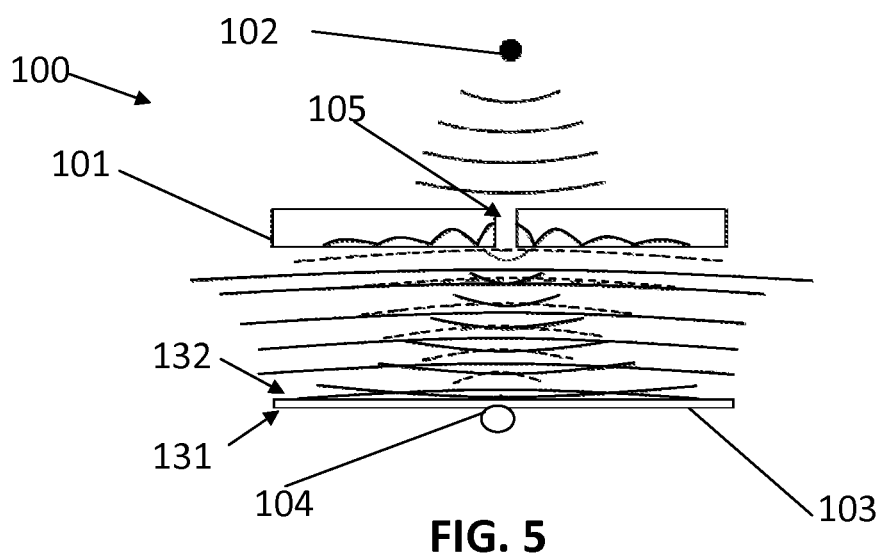
FIG. 5 shows a holographic imaging device according to a third embodiment of the first aspect of the present disclosure.

Further, referring to FIG. 5, in embodiments of the disclosure, the aperture 105 may be integrated in the image sensor 101. The radiation source 102 may be located above the image sensor 101. The aperture 105 may therefore be a through hole perforating the image sensor 101 in order to allow radiation, e.g., light, to pass through the aperture 105. This aperture 105 may function as a pin-hole for illuminating the object 104 with spatially coherent radiation, such as when the object is contacting the contact side 131 of the partially reflective surface 103. The image sensor 101 can be placed close to the observed object 104 and parallel to the partially reflective surface 103, while capturing almost all light diffracted by the object.

Figure 6:
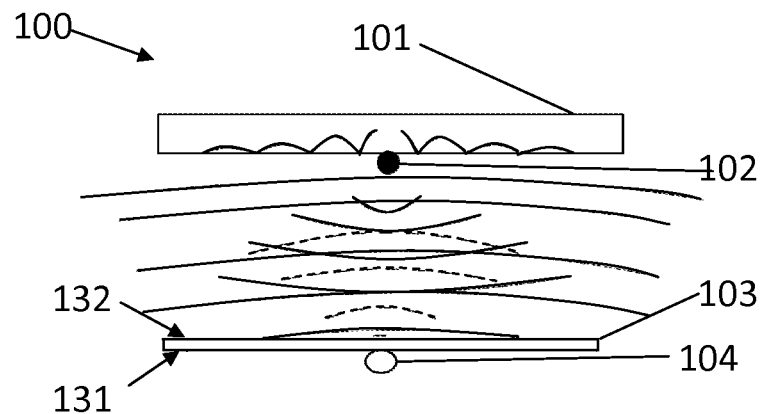
FIG. 6 shows a holographic imaging device according to a fourth embodiment of the first aspect of the present disclosure.

Referring to FIG. 6, the radiation source 102 may be arranged on the image sensor 101. For example, the image sensor 101 may form part of a semiconductor circuit chip on which the radiation source 102, e.g., a LED or VCSEL (Vertical-cavity surface-emitting laser), is also integrated. For example, the radiation source 102 may be an LED, which can be mounted on the imager by MCM (multichip module) integration, or direct process integration, e.g., processing the imager in GaN technology and providing the LED or a plurality of LEDs on a predetermined location or locations. Furthermore, a plurality of radiation sources 102 may be positioned on the image sensor 101, and multiple images of the object 104 may be obtained corresponding to radiation waves produced by this plurality of radiation sources.

In embodiments of the disclosure, the radiation source 102 may be located inside the aperture 105, e.g., integrated into the wall of the aperture 105. Thus, the device 100 may be more compact and easier to handle. Further, the device 100 may be implemented as a single chip solution, e.g., which requires no further assembly actions. Therefore, this device may be a compact alternative to, for example, a conventional optical microscope.

Embodiments of the first aspect of the disclosure may further comprise at least one MEMS-based optical valve for shutting the aperture 105 provided in the image sensor 101. Furthermore, a plurality of apertures 105 may dynamically shut out a plurality of radiation sources, such as LED's, for example, for creating a more detailed holographic image of the object under test. Several images can be recorded for creating a super-resolution and/or multispectral image of the object under investigation.

Figure 7:
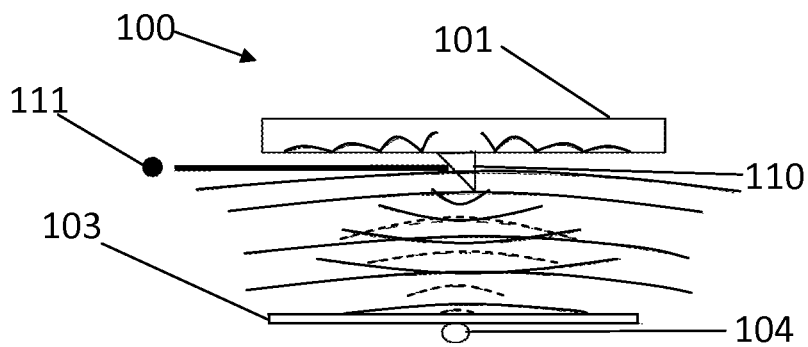
FIG. 7 shows a holographic imaging device according to a fifth embodiment of the first aspect of the present disclosure.

In an embodiment of the first aspect of the disclosure, as illustrated in FIG. 7, for example, the radiation source 102 may comprise a microelectromechanical systems (MEMS) device 110 for reflecting a radiation wave, e.g., emitted by an at least partially coherent external radiation emitter 111, onto the object under study 104 and the reflective surface 103. The MEMS device 110 for reflecting the radiation wave can be arranged in the region between the partially reflective surface 103 and the image sensor 101, or the MEMS device 110 can be arranged on the image sensor 101, e.g., on the surface of the image sensor 101 which faces the partially reflective surface 103. This allows the radiation wave to be generated externally, e.g., by an external light source 111 with high coherency, low speckle, etc., regardless of physical dimensions of the light source. The light of such external light source 111 may thus be delivered onto the object under study 104 by reflecting on the MEMS device 110. In such embodiments, the radiation wave may be generated by an external laser device, for example. The external radiation source 111 may be located outside the region between the image sensor and the reflective surface, and may therefore be subject to less tight design constraints.

Figure 8:
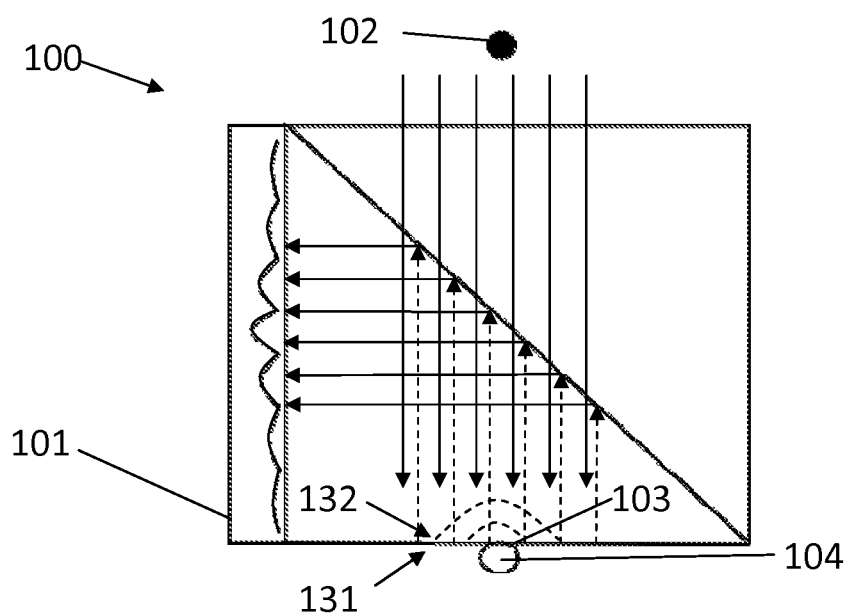
FIG. 8 shows a holographic imaging device according to a sixth embodiment of the first aspect of the present disclosure.

In an embodiment of the first aspect of the present disclosure, as illustrated in the example of FIG. 8, the holographic imaging device 100 may comprise a semi-transparent prism. This prism may be positioned with a contact side 131 onto an object under study 104. At least one radiation source 102 may project a radiation wave towards an imaging side 132 of a partially reflective surface 103 of the prism. This radiation may pass through a transparent portion of the prism, and may be partially reflected by this imaging side 132. The other part of the radiation wave, not reflected by the imaging side 132, is transmitted thereto, and part thereof impinges on the object under study 104, from where it is reflected back into the prism. The reflected radiation waves, both the ones reflected by the imaging side 132 and the ones reflected by the object under study 104, reflect on the non-transparent surface of the semi-transparent prism, so as to be guided towards an image sensor 101. This image sensor 101 is arranged for determining an interference pattern between the radiation wave 107 reflected by the imaging side 132 of the partially reflective surface 103 and the radiation wave 107 reflected by the object under study 104 when contacting the contact side 131 of the partially reflective surface 103.

It is an aspect of such embodiment that the radiation source 102 can be conveniently placed such that there is no need for an aperture or a reflector. Hence the set-up as proposed in this embodiment is easier and incurs lower manufacturing costs.

In embodiments of the first aspect of the disclosure, the device 100 may further comprise an actuating means, e.g., a sub-pixel moving means, for relative movement of the image sensor 101 with respect to the object under study 104 and/or with respect to the radiation source 102, for recording multiple images from the object 104 from different viewpoints. As a result, a higher resolution holographic image of the object can be obtained resulting in a more detailed analysis of the object under investigation. The higher resolution holographic image may be obtained by recording a plurality of images resulting in a super-resolution holographic image. As a result, a single light source may suffice to achieve super-resolution imaging. The relative position of the light source with respect to the imager may change at a sub-pixel level. For example, nine images may be acquired with sub-pixel shifts, e.g., forming a grid of three columns in a first direction and three rows in an orthogonal direction, which may result in a threefold increase in resolution of the final reconstructed image compared to a single image acquisition.

In embodiments of the first aspect of the device, the at least one radiation source 102 may comprise an optical waveguide to provide a localized light emission point. The optical waveguide may be an optical fiber that is positioned on top of the image sensor 101, and may end in between the image sensor 101 and the partially reflective surface 103, e.g., to direct light towards the partially reflective surface 103. Furthermore, a plurality of optical waveguides may be positioned on the image sensor 101. The plurality of optical waveguides may be controlled individually so as to illuminate the object under study 104 under investigation from different perspectives in order to create a higher resolution holographic image from a plurality of recorded images. Thus, the higher resolution image or super-resolution image can provide a more detailed image of the object under investigation 104. Furthermore, light may be supplied to the optical waveguide or optical waveguides by an external light source 111. The light can be fully contained within the waveguide, without any scattering of light of objects in its path. In embodiments of the first aspect of the disclosure, a single external light source 111 may used, e.g., emitting light that is split into multiple optical waveguides. The external light source 111 may furthermore be tunable for different wavelengths. For example the light source 11 may comprise a tunable laser.

In embodiments of the disclosure, a filter may be used to tune the wavelength of the radiation source 102 to a specific wavelength, e.g., to improve the spectral coherence of the emitted radiation.

In embodiments of the first aspect of the disclosure, the radiation source 102 may comprise a plurality of light sources, in which each light source may have a different wavelength. Any one of the plurality of light sources may be a monochromatic light source with a predetermined wavelength. A sequence of images of the object under study may be recorded, in which for each recording a different light source may illuminate the object. For example, when imaging biological samples, light absorption and/or scattering properties may differ in a wavelength dependent manner between cells and/or organelles.

In an embodiment of the first aspect of the disclosure, a multispectral image sensor may be used in combination with a radiation source 102 for illuminating the object under study 104 with multiple wavelengths, so as to enable multispectral imaging. A holographic image may be captured by multiple sequential captures. This may lead to a better overall reconstructed image quality of the object under study. Further, the information comprised in the reconstructed image may be used to identify differences between dead or living cells, which may be of interest for application in the biopharmaceutical industry.

The device 100 may also include a processor or processing means for reconstructing an image representation of the object under study 104, e.g., a holographic image, taking into account the determined interference pattern. This reconstruction may be achieved by standard algorithms known in the art, such as Fresnel approximation, convolution approximation, and/or angular spectrum approximation algorithms. Furthermore, it may be an aspect of embodiments of the disclosure that the distance and inclination between the image sensor 101 and the object 104 do not need to be controlled or determined. In embodiments of the disclosure, software algorithms that can be implemented on the processor or processing means, may compensate for mechanical inaccuracies or uncertainties, for example, the x-y-z alignment coordinates and exact offset and/or distance measurements, and the xy-xz-yz rotational alignments. These may be compensated in software by, for example, sweeping across multiple depths to find the exact reconstruction distance. The nature of the holographic reconstruction algorithm enables this, as the recorded image basically contains information from all the depths, e.g., from the whole imaged volume.

Figure 9:
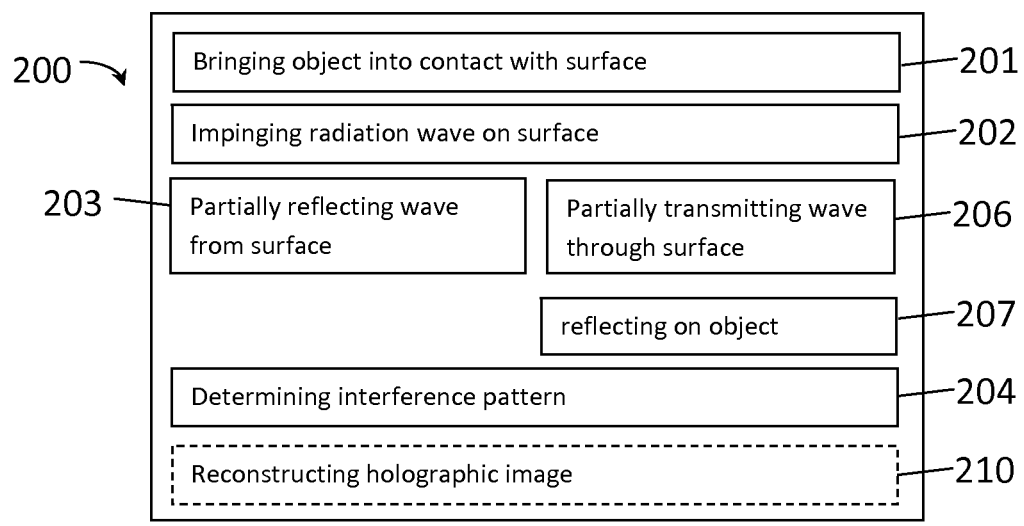
FIG. 9 shows an example method according to embodiments of a second aspect of the present disclosure.

In a second aspect, the disclosure relates to a method 200 for imaging an object under study 104, e.g., for creating a holographic image of the object 104. Referring to FIG. 9, the method 200 comprises a block 201 for bringing an object under study 104 into contact with a partially reflective surface 103, a block 202 for impinging an at least partially coherent radiation wave 107 on the partially reflective surface 103, e.g., irradiating the partially reflective surface 103 with at least one radiation source 102, for example, illuminating the object 104 and the reflective surface 103 with at least one light source, e.g., a LED or a laser. This impinging at block 202 may comprise illuminating the partially reflective surface 103 with a plurality of distinct light sources. The impinging at block 202 may be performed using a coherent light source. The coherent light source may comprise a light source in combination with a pin-hole, e.g., a LED and a pinhole, or may comprise a laser.

The method 200 also comprises a block 203 for partially reflecting the impinging radiation wave 107 from the partially reflective surface 103, and a block 206 for partially transmitting the radiation wave 107 through the partially reflective surface 103, e.g., splitting the incident radiation wave into a transmitted part and a reflected part by the partially reflective surface. The method 200 also comprises a block 207 for reflecting a radiation wave transmitted through the partially reflective surface 103 from the object under study 104, and a block 204 for determining an interference pattern between a radiation wave reflected by the partially reflective surface 103 and a radiation wave reflected by the object under study 104, e.g., recording the interference pattern of reflected optical beams from the object 104 and from the partially reflective surface 103, for example, recording this interference pattern with an image sensor 101. This determining at block 204 may comprise determining a plurality of interference patterns corresponding to light originating from a plurality of distinct light sources.

The method 200 may further comprise a block 210 for reconstructing an image representation of the object under study 104, e.g., a holographic image, taking into account the interference pattern.

The method may further comprise the activating or deactivating of MEMS-based optical valves, e.g., located inside an aperture on the image sensor 101, for illuminating the object 104 from different perspectives and recording multiple images of the object 104 to create a super-resolution holographic image. The method may further comprise a step of imaging the object 104 multiple times and post-processing data to create a super-resolution image.

The method 200 may further comprise a step of illuminating the object with different wavelengths and capturing multiple images of the object to create a holographic image. The capturing can be performed by a CMOS multi or hyperspectral image sensor.

The method 200 may be used in combination with a device 100 as described in relation to the first aspect of the present disclosure.

What is claimed is:

1. A holographic imaging device for imaging an object under study, the device comprising:
    a partially reflective surface having a contact side for contacting the object under study and an imaging side for partially reflecting a radiation wave;
    at least one radiation source for projecting the radiation wave onto the imaging side of the partially reflective surface; and
    an image sensor arranged to receive the radiation wave when reflected by the partially reflective surface, the image sensor being adapted for determining an interference pattern between the radiation wave reflected by the imaging side of the partially reflective surface and the radiation wave reflected by the object under study when contacting the contact side of the partially reflective surface, wherein the at least one radiation source is located on the image sensor.

2. The device according to claim 1, furthermore comprising a slab of transmissive material having a first surface arranged on the image sensor and a second surface being the partially reflective surface.

3. The device according to claim 1, wherein the radiation source is located between the image sensor and the partially reflective surface.

4. The device according claim 1, wherein the image sensor comprises at least one aperture optically coupled to the at least one radiation source for imparting a spatial coherence to the radiation wave.

5. The device according to claim 4, wherein the at least one radiation source is located inside the at least one aperture.

6. The device according to claim 4, further comprising a MEMS-based optical valve arranged on the image sensor for shutting the at least one aperture.

7. The device according to claim 1, wherein the at least one radiation source comprises a MEMS device for directing the radiation wave towards the partially reflective surface.

8. The device according to claim 1, furthermore comprising a semi-transparent prism having a first surface arranged on the image sensor and a second surface being the partially reflective surface.

9. The device according to claim 1, wherein the at least one radiation source comprises one or more of an optical waveguide, light emitting diode, or a laser.

10. The device according to claim 1, furthermore comprising an actuating means for moving the image sensor in relation to one or more of the object under study or the at least one radiation source for recording multiple images from the object.

11. The device according to claim 1, wherein the image sensor comprises a multispectral or hyperspectral image sensor.

12. The device according to claim 1, wherein the at least one radiation source comprises a plurality of light sources for emitting light of different wavelengths.

13. The device according to claim 1, wherein the device does not comprise a further intermediate optical element configured to change a direction of the radiation wave reflected by the object toward the image sensor.

14. The device according to claim 1, wherein the at least one radiation source and the image sensor are integrated on a semiconductor circuit chip.

15. A method for imaging an object under study, the method comprising:
bringing an object under study into contact with a partially reflective surface;
impinging an at least partially coherent radiation wave on the partially reflective surface;
partially reflecting the radiation wave from the partially reflective surface and partially transmitting the radiation wave through the partially reflective surface;
reflecting the radiation wave transmitted through the partially reflective surface from the object under study; and
determining an interference pattern between the radiation wave reflected by the partially reflective surface and the radiation wave reflected by the object under study.

16. The method according to claim 15, furthermore comprising reconstructing an image representation of the object under study taking into account the interference pattern.

17. The method according to claim 15, further comprising:
determining the interference pattern by an image sensor arranged to receive the radiation wave reflected by the partially reflective surface and the radiation wave reflected by the object under study,
wherein the image sensor is arranged on a first surface of a slab of transmissive material, and wherein the partially reflective surface is a second surface of the slab of transmissive material.

18. The method according to claim 17, wherein at least one radiation source is configured for projecting the radiation wave, and wherein the at least one radiation source and the image sensor form a semiconductor circuit chip.

19. The method according to claim 17, further comprising transmitting the radiation wave reflected by the object under study back through the partially reflective surface toward the image sensor without passing the radiation wave reflected by the object under study through a further intermediate optical element besides the partially reflective surface and the transmissive material.

* * * * *